(12) United States Patent
Presby

(10) Patent No.: US 6,847,496 B1
(45) Date of Patent: Jan. 25, 2005

(54) TRANSMISSION OF FREE-SPACE OPTICAL COMMUNICATION SIGNALS THROUGH WINDOWS

(75) Inventor: Herman Presby, Highland Park, NJ (US)

(73) Assignee: Terabeam Corporation, Falls Church, VA (US)

( * ) Notice: Subject to any disclaimer, the term of this patent is extended or adjusted under 35 U.S.C. 154(b) by 630 days.

(21) Appl. No.: 09/904,880

(22) Filed: Jul. 12, 2001

(51) Int. Cl.[7] ............................................. G02B 13/20
(52) U.S. Cl. ...................................... 359/707; 359/599
(58) Field of Search ................................ 359/707, 599, 359/641, 741, 622

(56) References Cited

U.S. PATENT DOCUMENTS

| | | | | |
|---|---|---|---|---|
| 4,427,265 A | * | 1/1984 | Suzuki et al. | 359/599 |
| 5,353,133 A | * | 10/1994 | Bernkopf | 349/5 |
| 5,359,454 A | * | 10/1994 | Steenblik et al. | 359/463 |
| 6,721,102 B2 | * | 4/2004 | Bourdelais et al. | 359/628 |

* cited by examiner

Primary Examiner—Ricky Mack
Assistant Examiner—Brandi N Thomas
(74) Attorney, Agent, or Firm—Blakely Sokoloff Taylor & Zafman LLP

(57) ABSTRACT

A method and apparatus for improving the transmission of a free-space optical communications signals through windows having surface imperfections. A void-filling material is applied to one or both surfaces of the window to fill any non-flat surface voids on those surfaces in areas through which an optical communications signal passes. In one embodiment, one or two substantially perfect optically translucent plates are mounted to the imperfect surface(s) of the window so as to capture the void-filling material between an inside surface of each optically translucent plate and the imperfect surfaces of the window. The void-filling material is selected to have an index of refraction that substantially matches an index of refraction for the window at an optical wavelength corresponding to the free-space optical communication signal. As a result, the adverse effects that would normally be caused to free-space optical communication signals that are passed through windows having surface imperfections are substantially eliminated.

19 Claims, 6 Drawing Sheets

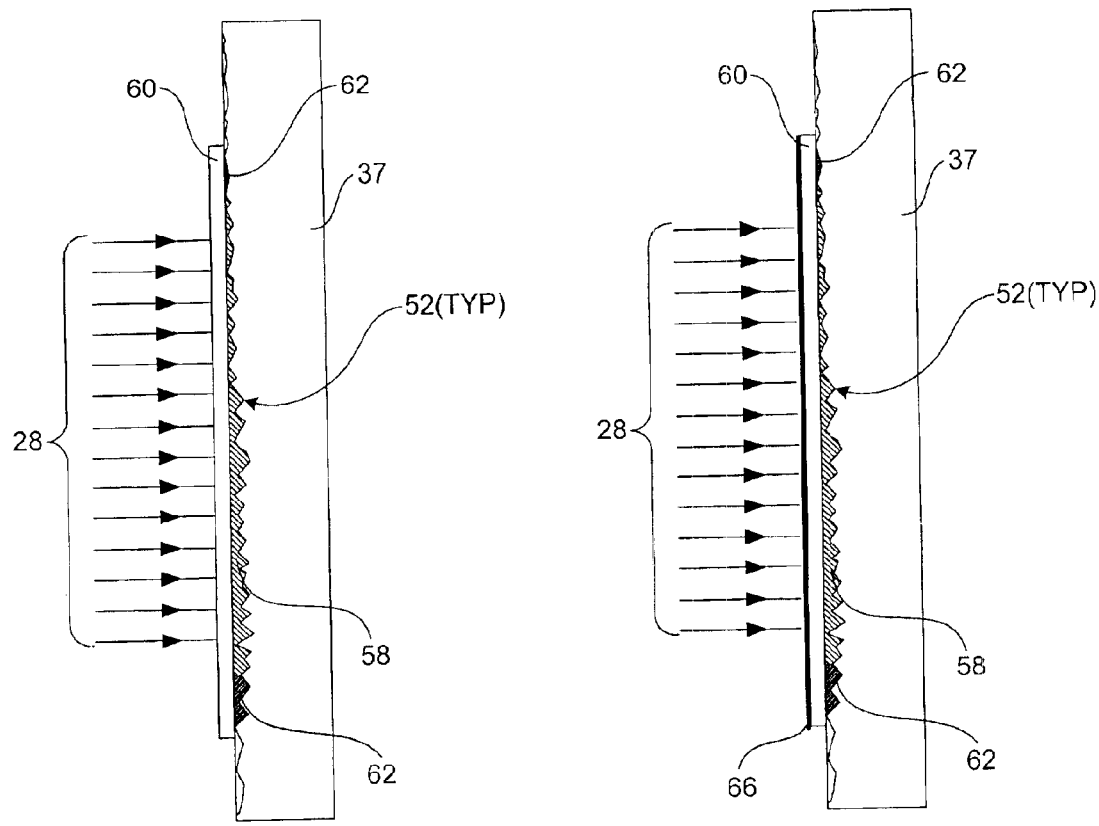
*FIG. 5A*  *FIG. 5B*
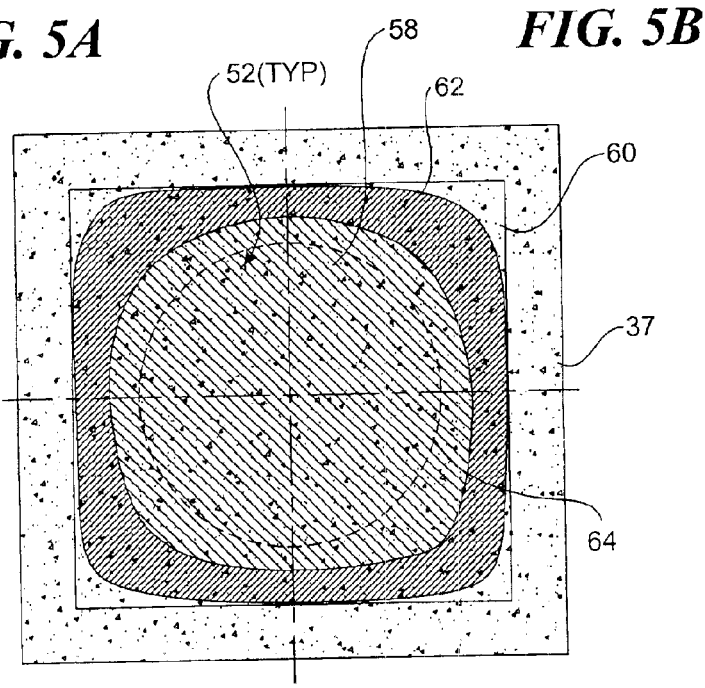
*FIG. 6*

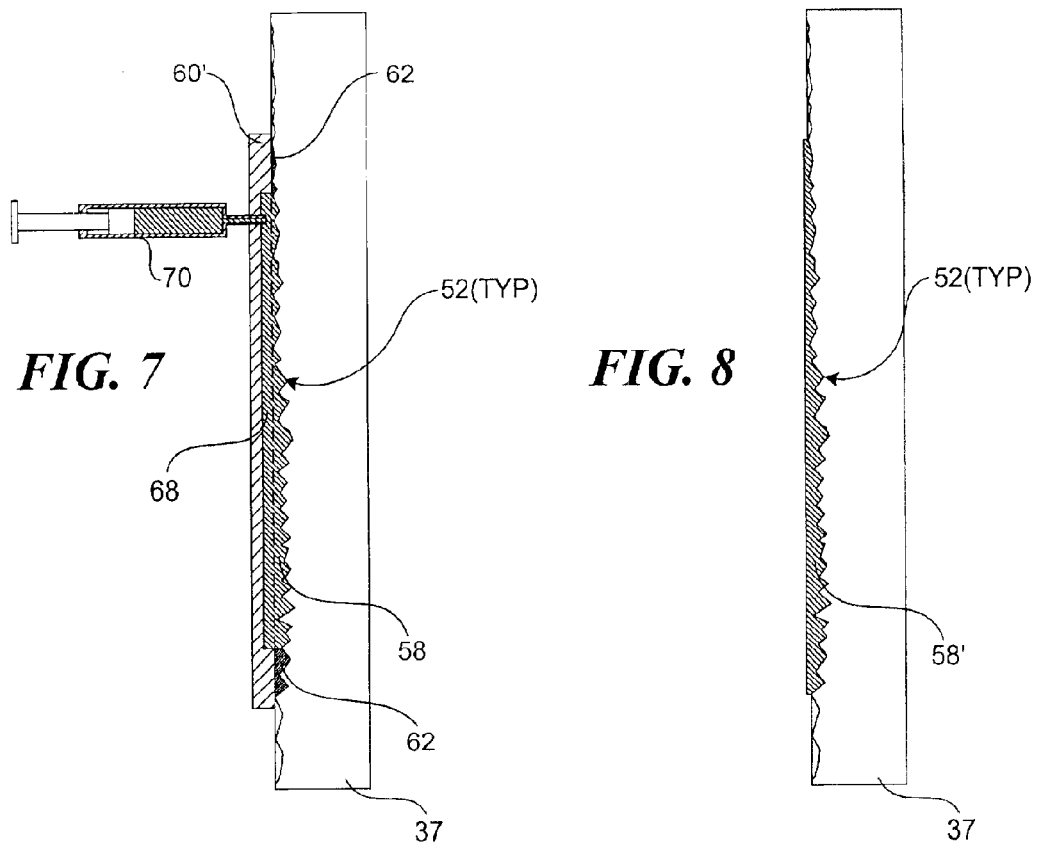
FIG. 7   FIG. 8
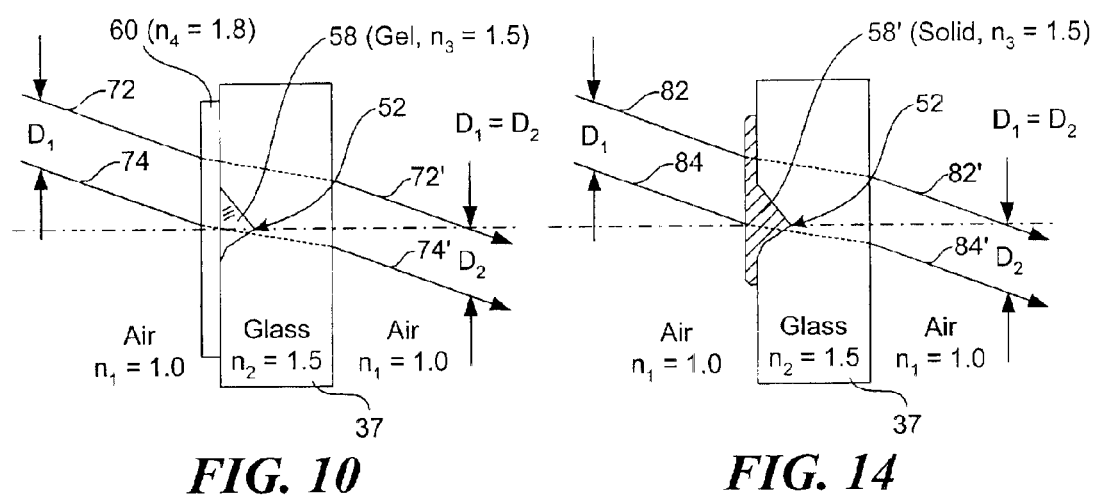
FIG. 10   FIG. 14

TRANSMISSION OF FREE-SPACE OPTICAL COMMUNICATION SIGNALS THROUGH WINDOWS

BACKGROUND OF THE INVENTION

1. Field of the Invention

The present invention generally relates to free-space optical communications systems, and, more specifically, to a method and apparatus for improving transmission of free-space optical communication signals through windows with surface imperfections, such as pitting, surface waviness, and other non-flat surface distortions.

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free-space and therefore do not require the routing of cables or fibers between locations. Thus, wireless optical communications are also known as free-space or atmospheric optical communications. For instance, in a free-space optical communication system, a beam of light is directed through free-space from a transmitter at a first location to a receiver at a second location. Data or information is encoded into the beam of light, and therefore, the information is transmitted through free-space from the first location to the second location.

A conventional free-space optical system is shown in FIGS. 1A and 1B. The free-space optical system includes a pair of transceiver stations 10 that are typically located on or in separate buildings or towers, such as depicted by buildings 11 and 12. Each transceiver station 10 includes a primary collector 13 to which a secondary mirror 14 is coupled via a plurality of rigid struts 16. The transceiver stations further include a transmitted signal lens 18 mounted within secondary mirror 14, and a set of transmitter/receiver optics and electronics 20. All of components 13, 14, 16, 18, and 20 are operatively coupled to a yoke that is connected to a base 22 via a gimble assembly, such that these components are all moved in response to a gimbled movement of the yoke relative to a static surface on which the base 22 is placed.

With reference to FIG. 1B, data is transmitted from a transceiver station 10T to a transceiver station 10R in the following manner. An optical signal 24 is generated by transmitter/receiver optics and electronics 20T of transceiver station 10T and directed through an opening 26T defined in primary collector 13T towards transmitted signal lens 18T, which produces a collimated signal 28. As collimated signal 28 moves toward transceiver station 10R, the width of the signal diverges very gradually. As will be recognized by those skilled in the art, the divergence of the various optical signals depicted in the Figures contained herein are exaggerated for clarity. Upon reaching transceiver station 10R, the outer portions of collimated signal 28 impinge upon primary collector 13R, which comprises a concave mirrored surface that redirects those portions of the signal that impinge upon it toward secondary mirror 14R. Collimated signal 228 is then reflected by secondary mirror 14R towards the secondary mirror's focal point 30, where it is received by transmitter/receiver optics and electronics 20R.

SUMMARY OF THE INVENTION

The present invention provides a method and apparatus for improving the transmission of free-space optical communications signals through windows having surface imperfections, such as pitting, waviness, and other non-flat surface distortions. A void-filling material is applied to one or both surfaces of the window to fill any non-flat surface voids on those surfaces in areas through which the optical communications signal passes. In one embodiment, the window has one surface (typically the exterior) that is imperfect and a substantially perfect (i.e., with no or very minor surface imperfections) optically translucent plate is mounted to this imperfect window surface so as to capture the void-filling material between an inside surface of the optically translucent plate and the imperfect surface of the window. In another embodiment, both surfaces of the window are imperfect. As before, the void-filling material is applied to the second imperfect surface of the window to fill any surface voids an the area through which the optical signal passes, and a second substantially perfect optically translucent plate is mounted to this second imperfect surface to capture the void-filling material. The void-filling material is selected to have an index of refraction that substantially matches an index of refraction for the window at an optical wavelength corresponding to the free-space optical communication signal. As a result, the adverse effects that would normally be caused to free-space optical communication signals that are passed through imperfect windows with surface distortions are substantially eliminated.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5A is a cross-section schematic diagram illustrating a first embodiment of the invention in which a void-filling material such as a liquid or gel is applied to an imperfect window surface to fill any surface voids in an area of the imperfect surface through which an optical communications signal passes, wherein the void-filling material is captured by a substantially perfect optically translucent plate that is mounted to the window;

FIG. 5B illustrates an alternate embodiment of FIG. 5A in which a protective coating is applied to the exterior surface of the optically translucent plate to protect the plate from environmental damage;

FIG. 6 is an elevational view corresponding to the embodiments illustrated in FIGS. 5A and 5B;

FIG. 7 is a cross-section schematic diagram illustrating an embodiment of the invention in which a planar cavity is defined in the substantially perfect optically translucent plate and the void-filling material is inserted into a cavity defined between the optically translucent plate and the window;

FIG. 8 is a cross-section schematic diagram illustrating an embodiment of the invention in which a void-filling material is applied over the surface of an imperfect window in a non-solid form and cured into a solid form such that the outside surface of the void-filling material is substantially perfectly planar;

FIG. 10 is a schematic diagram corresponding to the embodiment of FIG. 5A illustrating the effect of filling a surface void with a void-filling material having an index of refraction that substantially matches the index of refraction of the window material;

FIG. 14 is a schematic diagram corresponding to the embodiment of FIG. 8 illustrating the effect of applying a void-filling material having an index of refraction that substantially matches the index of refraction of the window material over the surface of an imperfect window;

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one example embodiment of the present invention, point-to-point free-space optical communications are provided from a transmitter to a receiver. The transmitter and receiver may be located at the same location or at different locations such as on different buildings within a line of sight of each other. It is appreciated that the transmitter and the receiver may be parts of transceivers, or transmitter-receiver combinations, at their respective locations, such that bi-directional communications are provided. In the example embodiment, the transmitter includes an optical source that generates an optical communications beam, such as a laser beam or the like, on which data or information is modulated. The optical communications beam is not limited to being monochromatic or to any particular wavelength or color and may include the visible light as well as ultra violet or infra-red portions of the spectrum.

Figure 1A:
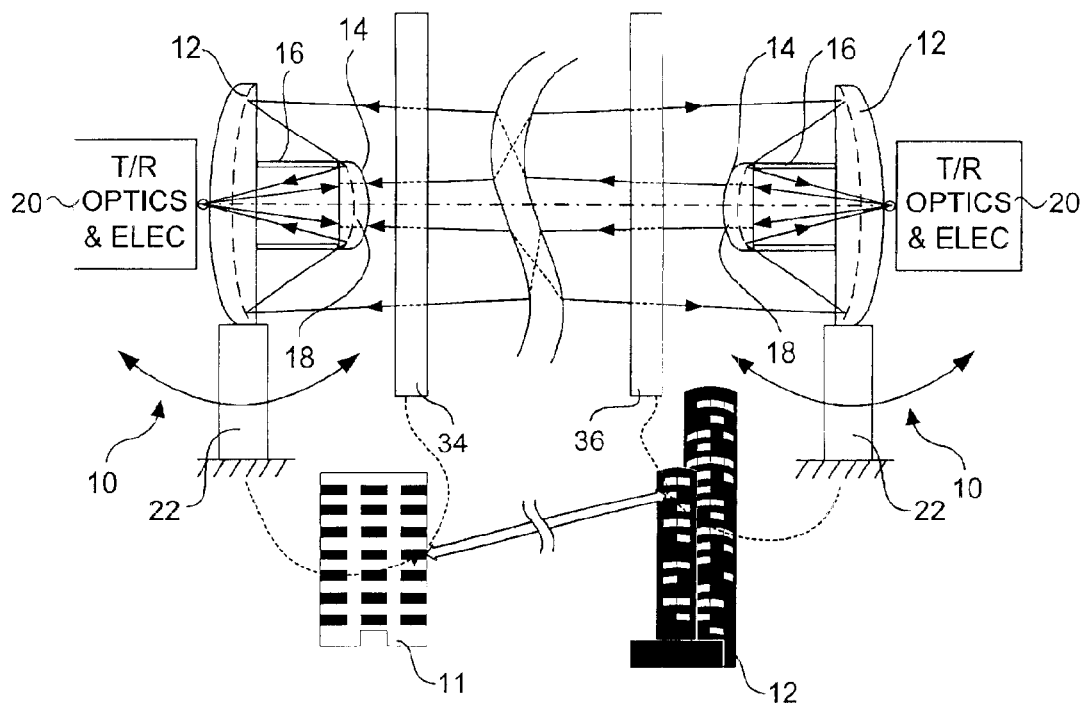
FIG. 1A is an illustration of a conventional free-space optical communications system that uses on-axis primary and secondary reflectors and provides transmitting and receiving capabilities at a pair of transceiver stations disposed at remote locations within respective buildings.
Figure 1B:
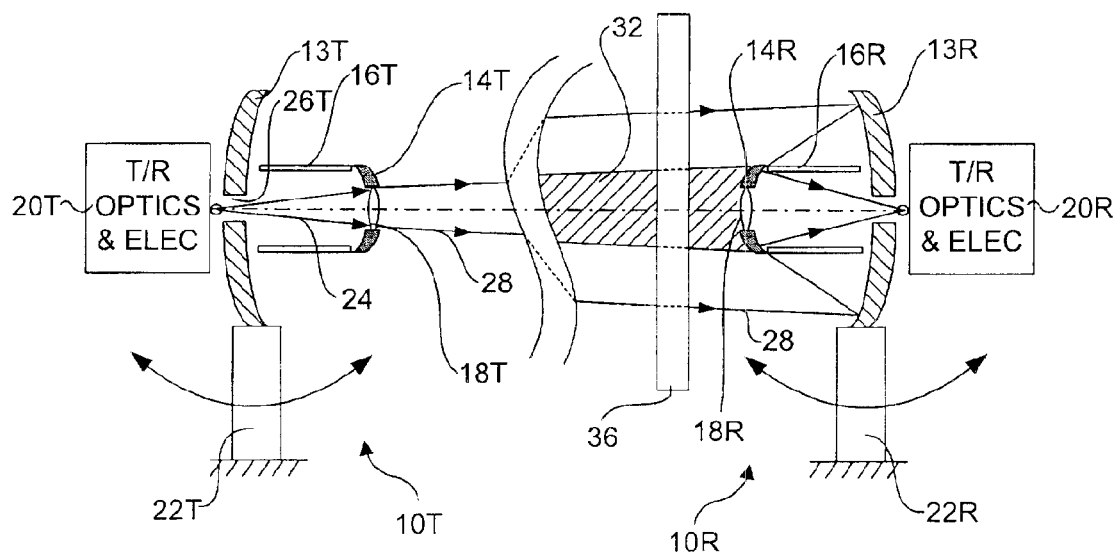
FIG. 1B shows how an optical communications signal is transmitted by a first transceiver station and received by a second transceiver station.
Figure 2:
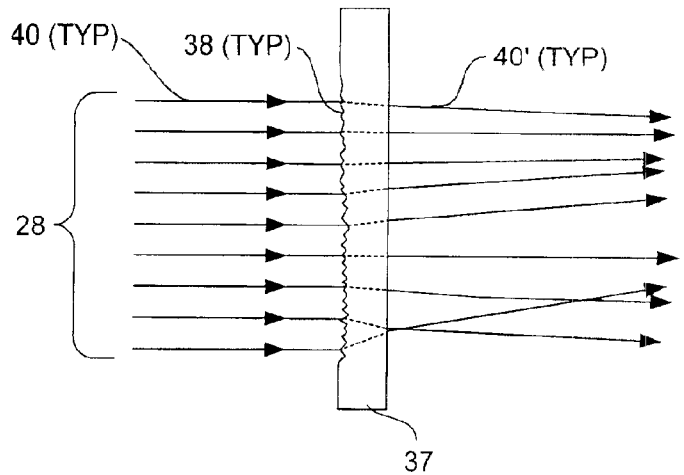
FIG. 2 is a schematic diagram comprising a cross-section of an imperfect window that is used to illustrate the adverse effects caused to optical communication signals as they pass through windows with imperfect surfaces.

With reference to the conventional free-space communication system shown in FIGS. 1A and 1B, in many system implementations, optical signals will need to pass through building windows, such as building windows 34 and 36, which respectively correspond to exterior office or room windows in buildings 11 and 12. As shown in FIG. 2, this may presents a problem when the surfaces on one or both sides of the window are imperfect. As used herein, an imperfect window comprises a sheet of material, such as glass, having at least one primary surface with surface imperfections, such as pits, roughness, waviness, and other non-flat surface distortions, which cause localized surface areas on the window to not be co-planar with a plane defined to be coincident with the imperfect surface of the window. For example, the outside of building windows are exposed to environmental conditions that may roughen the exterior surface of the windows, as depicted by surface imperfections 38 on window 36. In other instances, windows are manufactured with similar imperfections. These non-flat localized surface areas may displace and even break-up the transmitted or received beams, seriously impairing link margin. The effect of surface imperfections 38 on collimated beam 28 is illustrated in FIG. 2, wherein portions of the collimated beam, depicted by light rays 40, are caused to be redirected at various angles when they pass through an imperfect window 37, as depicted by light rays 40'. Details concerning what causes these adverse effects are discussed below.

For each ray 40–40', the degree of redirection will generally be a function of the incidence angle of the ray relative to the normal of the localized portions of the glass surfaces it passes through, and the index of refraction of the window material. The index of refraction of a material, n, is defined as the ratio of the velocity of light in a vacuum (c=2.998×10$^8$ m/sec) to the velocity that light passes through the material, v, i.e., $$n = c/v \tag{1}$$

The index of refraction of a material is generally dependent on its density and the wavelength of the light under consideration. For most calculations, the index of refraction of air is considered to be 1.0. If a higher degree of accuracy is required, for yellow light (wavelength=580 nanometers) air has an index of refraction of 1.0002 or 1.0003 (depending on the measurement source) under standard atmospheric pressure and temperature (29.92 inches Hg, 70° F.).

In most instances, the material for a building window will comprise some type of glass. Depending on the particular glass used in the window, the index of refraction for a window will generally range from 1.4–1.9, with a nominal value of 1.5. For example, for yellow light, crown glass has an index of refraction of 1.517, moderately dense flint glass has an index of refraction of 1.655, and heavy flint glass has a density of 1.89.

Light is considered to travel in light waves. Because light waves travel at different speeds in different mediums, when light passes from a lower index to a higher index material (e.g., an air/window boundary), the wave front must slow down, causing the light beam to bend. Conversely, when light exits the higher index material, the wave front speeds up to its original speed.

The degree of bending is a function of the angle of the incident ray with respect to the surface normal of the material being entered, and the index of refraction of the two materials. When light is incident on an interface between two materials, it can be reflected or refracted. Both situations are described quantitatively by Snell's Law:

$$n_1 \sin\theta_1 = n_2 \sin\theta_2 \tag{2}$$

wherein $n_1$ is the index of the first (incident) material, $n_2$ is the index of the second medium, $\theta_1$ is the angle of the incident ray (also known as the angle of incidence) with respect to the surface normal at the interface between the two materials, and $\theta_2$ is the angle of the outgoing ray with respect to the surface normal.

Figure 3A:
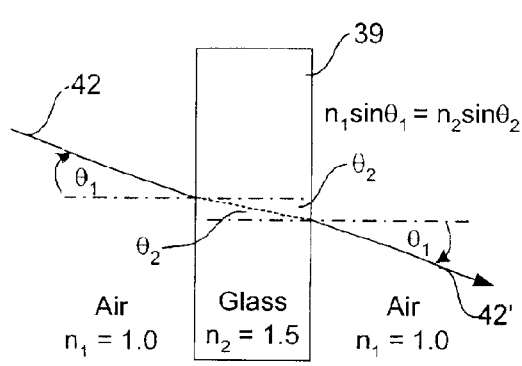
FIGS. 3A and 3B are schematic diagrams illustrating how light beams are bent when the pass through materials with different indexes of refraction in accordance with Snell's law.

Applying Snell's law, the bending caused to an exemplary light ray 42 as it passes through a perfect glass plate 39 (i.e. a plate with no surface imperfections) at an incident angle $\theta_1$ is shown in FIG. 3A. In this example, the light passes through air having an index of refraction $n_1=1.0$ and glass having an index of refraction $n_2=1.5$. It is noted that if the two face surfaces of the glass plate are parallel, the incident angle of the light ray entering the glass plate and the angle of a corresponding outgoing ray 42' exiting the glass plate will be equal (both depicted as $\theta 1$ in FIG. 3A).

Figure 3B:
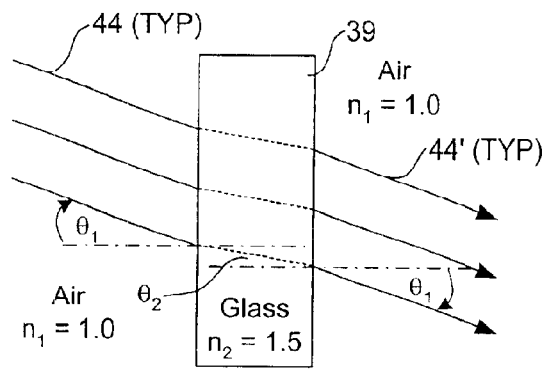

When a received or transmitted optical beam passes through a perfect window, all of the beam's light rays 44 are redirected the same degree, with the result that incoming parallel light rays exit as parallel rays 44', even if the incidence angle is significant, as shown in FIG. 3B. In contrast, when one of parallel light rays 46 and 48 pass through a surface imperfection in a imperfect glass plate 50, as exemplified by a pit 52, and the other ray passes through another perfect portion of the glass plate, the light rays exit the glass plate at non-parallel angles, as depicted by exiting light rays 46' and 48' in FIG. 4A.

Figure 4A:
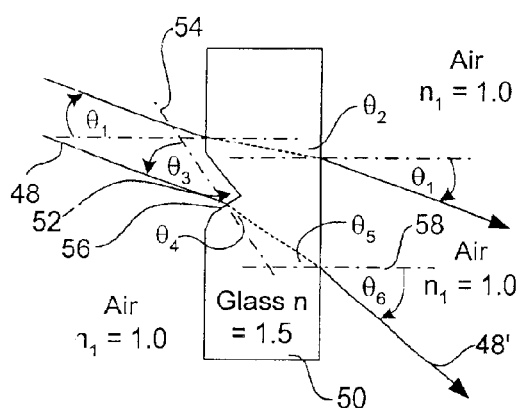
FIGS. 4A and 4B are schematic diagrams illustrating an adverse effect caused to parallel light beams when one of the beams passes through a surface distortion in a window.
Figure 4B:
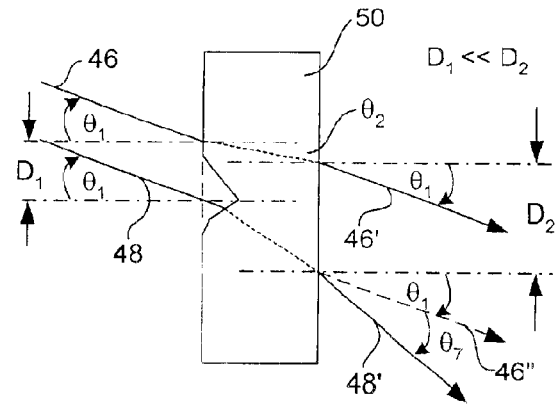

As depicted in FIGS. 4A and 4B, the path of light ray 46 is the same as light ray 42 in FIG. 3, illustrating an ideal condition in which the surface of imperfect glass plate 50 is perfectly flat in the areas corresponding to where light ray 46 enters the glass plate and where light ray 46' exits the glass plate. Applying Snell's law, the path of light ray 48 is as follows. The light ray enters the glass at an angle of incidence $\theta_3$ relative to the normal 54 of a surface 56, whereupon it is bent at an angle $\theta_4$ relative to normal 54. Upon exiting the glass, the light ray has an angle of incidence $\theta_5$ relative to a normal 58, and exits the glass at an angle of $\theta_6$.

There are three effects caused by surface imperfections, such as pit 52. First, the distance between parallel light rays is changed, as depicted in FIG. 4B wherein the distance $D_1$ between incoming light rays 46 and 48 is substantially smaller than the distance $D_2$ between exiting light rays 46' and 48', wherein $D_1$ and $D_2$ are measured at the input side and exit side of imperfect glass plate 50. Second, light rays 46' and 48' are no longer parallel, and now are diverging at an angle $\theta_1$.

A third effect caused by surface imperfections is that the phase between light rays may be changed. Generally, free-space optical communication signals comprise high-energy light beams, such as those generated by lasers, which are modulated at a very high frequency. By varying the "on" (or alternatively "off") time period, the modulated light beam can be made to produce a digital communication signal. As light passes through the glass, its speed is reduced. If the travel path through the glass is longer for some light rays than others, there will be a difference in the phase of those light rays. This difference can cause parts of the beam to interfere with each other, resulting in a beam containing sections with no light power at all.

The present invention addresses the foregoing problems caused by window surface imperfections by creating planar incident surfaces that appear (from the light rays' standpoint) to be substantially identical to that of encountered when passing through perfect glass, or other material used for building windows. With reference to FIGS. 5A and 6, in one embodiment, a void-filling material 58 comprising gel or liquid having an index of refraction that substantially matches the window material is applied to the window (e.g., window 37), whereupon a substantially perfect plate of glass, plastic, or other optically translucent (i.e., light at the working wavelength passes through the material with no or minimal distortion) material 60 is applied over the index-matching void-filling material to capture the gel or liquid, thereby filling any surface voids 52 with the gel or liquid and forming a substantially planar incidence surface between the substantially perfect optically translucent plate 60 and the void-filling material. In one embodiment, substantially perfect optically translucent plate 60 is secured to imperfect window 37 by means of an adhesive 62. As shown in FIG. 6, void-filling material 58 is applied to the center portion of substantially perfect optically translucent plate 60 that includes an area 64 through which collimated beam 28 passes, while adhesive 62 is applied around the periphery of the plate. Various types of adhesives may be used, including instant fixture adhesives such as cynoacrylates (a.k.a., "super glues") and contact cements, various types of epoxies designed for glass-type surfaces, and ultraviolet-cured adhesives, such as those manufactured by the Loctite corporation. An optional means for securing substantially perfect optically translucent plate 60 to imperfect window 37 is to secure the optically translucent plate to the window frame in which the imperfect window is held (not shown).

Substantially perfect optically translucent plate 60 is defined to be "substantially perfect" and "translucent" in the following manners. It is termed "substantially perfect" because the primary faces of the plate are substantially flat throughout with no or very minor surface imperfections. The term "translucent" means that the material enables optical communication signals to pass through it with minimal energy loss, including light signals having wavelengths in the non-visible spectrum. Suitable materials include various types of glasses, preferably having a ground exterior face or a face having a similar finish. Optionally, various types of high-performance translucent plastics may be used, such as Plexiglas™ and other carbonate plastics. In some embodiments, such as shown in FIG. 5B, it may be desired to apply a sealing/protective coating or layer 66 to the exterior surface of the substantially perfect optically translucent plate, which serves the functions of ensuring the flatness of the exterior surface and/or protecting the exterior surface against environmental damage over the life of the installation. Although illustrated as being rectangular in FIG. 6, substantially perfect optically translucent plate 60 may be of any configuration, including circular. For example, a ground optical flat having a circular shape may be used.

There are various techniques for encapsulating void-filling material 58 between the imperfect window face and the inside surface of substantially perfect optically translucent plate 60. In one embodiment, the substantially perfect optically translucent plate is laid flat and an adhesive is applied to the periphery of the top surface of the plate, whereupon a void-filling material 58 comprising a gel is applied to the plate within the area outlined by the adhesive. The plate is then quickly flipped upright and held against the window (e.g., imperfect window 37) until the adhesive cures to the point that it can hold the plate in place. In another embodiment, a substantially perfect optically translucent plate 60 is held against or affixed at one or more areas to imperfect window 37, whereupon a void-filling material 58 is applied around periphery areas of the plate. The voids in the area of imperfect window 37 inside of its peripheral areas are then filled with void-filling material 58 via a capillary or wicking action of void-filling material, which moves a portion of the void-filling material from the periphery areas to the inside areas.

An alternate assembly method is illustrated in FIG. 7, wherein a substantially perfect optically translucent plate 60' having a planar cavity 68 defined in its inside surface is used. In one embodiment, adhesive 62 is applied to the periphery of the plate, and the plate is held against imperfect window 37 until the adhesive is adequately cured. At this point, void-filling material 58 may be added by inserting the material into the void between the plate and the window, which includes cavity 68 and a portion of the imperfect window opposite the cavity. For example, the void-filling material may be inserted with through a hole in the plate with a syringe 70, whereupon the hole is plugged to prevent the void-filling material from escaping the cavity. This embodiment is particularly well-suited when low viscosity liquids are used for void-filling material 58.

Another embodiment of the invention is illustrated in FIG. 8. In this embodiment, a void-filling material 58' is applied over one or both surfaces of imperfect window 37 as a gel or liquid, and cures into a solid. For example, void-filling material 58' may be sprayed if it initially comprises a liquid or applied with a brush or roller if is initially comprises a gel. The void-filling material used for this embodiment will need to cure in a manner that creates a substantially perfectly planar exterior surface, and should be applied over an area that encompasses the area of the window through which the optical signals pass.

Figure 9:
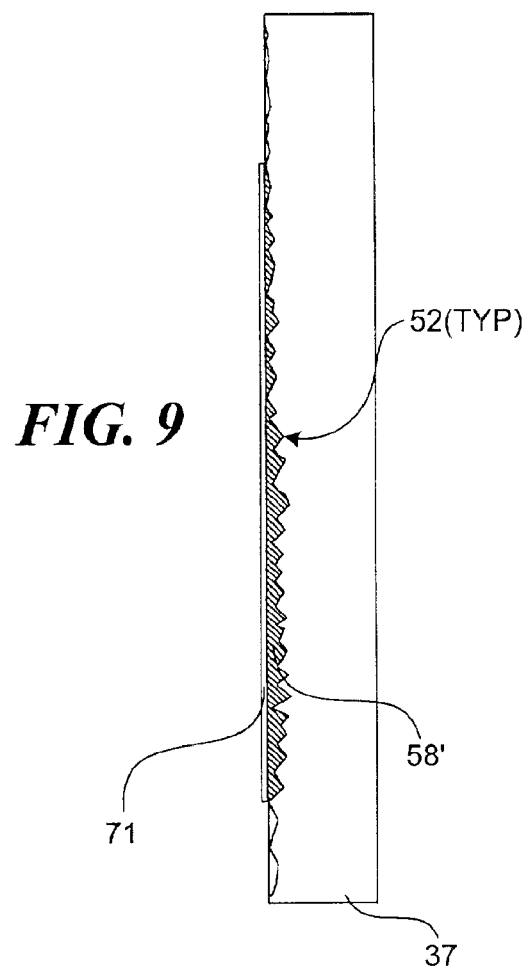
FIG. 9 is a cross-section schematic diagram illustrating an embodiment of the invention in which a void-filling material is applied over the surface of an imperfect window and covered with a flexible optically translucent sheet of material.

Yet another embodiment of the invention is illustrated in FIG. 9. In this embodiment, a void-filling material 58 is applied over one or both surfaces of imperfect window 37 as a gel or liquid, and a flexible optically translucent (to the optical signal wavelength) sheet of material 71 is applied over the void-filling material so that the voids in imperfect window 37 are filled with the void-filling material.

Figure 11:
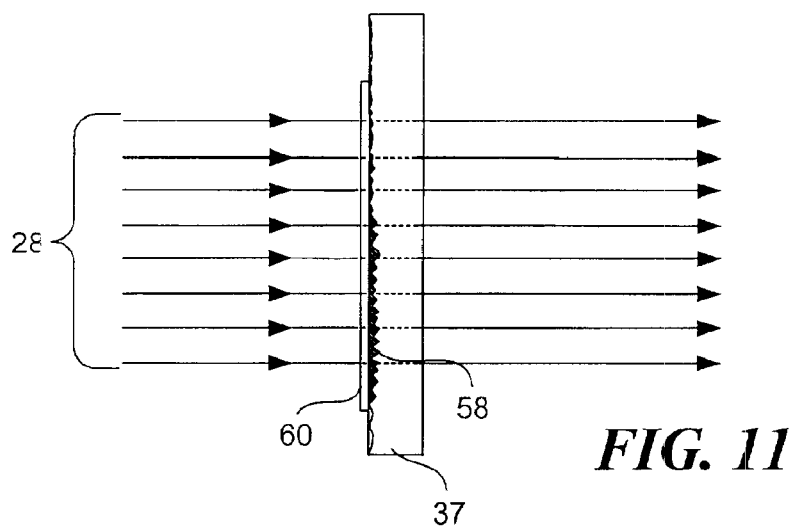
FIG. 11 is a schematic diagram illustrating how transmission of a free space optical communications signal that is substantially normal to an imperfect window is improved by an implementation of the invention.
Figure 12:
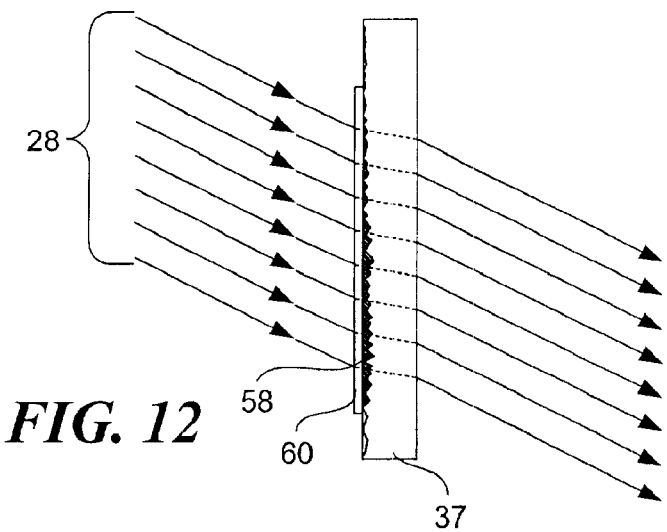
FIG. 12 is a schematic diagram illustrating how transmission of a free-space optical communications signal that passes through an imperfect window at a significant angle of incidence is improved by an implementation of the invention

An exemplary result obtained by the embodiment of FIG. 5A is illustrated in FIG. 10. In the Figure, a light ray 72 passes through perfect optically translucent plate 60 and imperfect window 37, while a parallel light ray 74 passes through perfect optically translucent plate 60, void-filling material 58, and imperfect window 37. Because the index of refraction for the window glass and the void-filling material are the same (in this example, n=1.5 for both), light rays 72 and 74 are caused to follow parallel paths. As a result, the distance between the rays before entering and after exiting the window, as depicted by distances $D_1$ and $D_2$, remains the same. In addition, the phase of the light rays remain synchronized. Thus, by applying the principles of the invention to optical communication systems that transmit and receive signals through imperfect windows, the problems previously caused by the imperfect surface of the windows may be corrected, as illustrated in FIGS. 11 and 12.

It is noted that in the forgoing example, the index of refraction of the perfect optically translucent plate ($n_4$=1.8) is not the same as the glass and the void-filling material ($n_2$=$n_3$=1.5). This type of configuration may be used in most circumstances, although it is preferable that when such configurations are used, both sides of the perfect optically translucent plate are substantially planar and devoid of imperfections. One reason for using a material with a higher index of refraction for substantially perfect optically translucent plate 60 than that used for the window is that such materials may exhibit better resistance to environmental damage.

Figure 13:
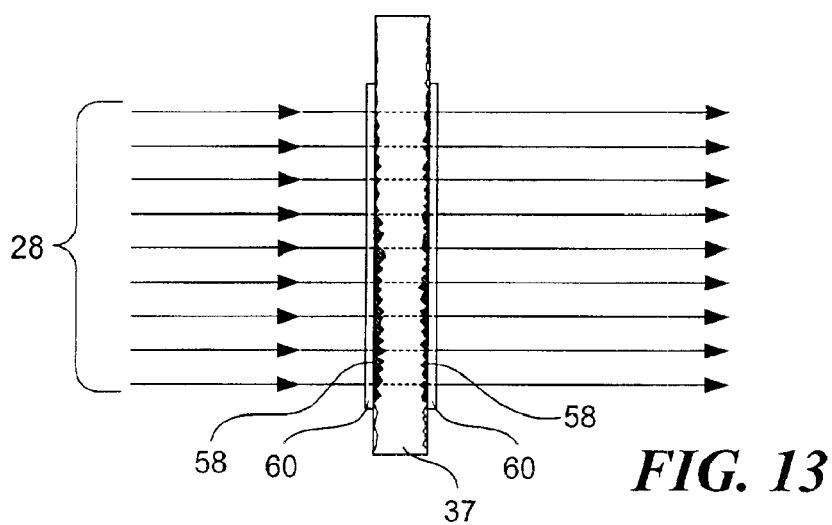
FIG. 13 is a schematic diagram corresponding to an embodiment of the invention in which the void-filling material and substantially perfect optically translucent plates are applied to both surfaces of a window.

In addition to applying the method and apparatus of the invention to a single side of an imperfect window, the same may also be applied to both sides of the window if imperfections exist on both of those sides. Exemplary results obtains by this embodiment are illustrated in FIG. 13.

An exemplary result obtained by the embodiment of FIG. 5A is illustrated in FIG. 14. In the Figure, a light ray 82 passes through a thin layer of void-filling material 58' and imperfect window 37, while a parallel light ray 84 passes through an a portion of void-filling material 58' in which a void 52 exists, and then passes through imperfect window 37. Because the index of refraction for the window glass and the void-filling material are the same (in this example, n=1.5 for both), light rays 82 and 84 are caused to follow parallel paths, which are depicted as paths 82' and 84'. As a result, the distance between the rays before entering and after exiting the window, as depicted by distances $D_1$ and $D_2$, remains the same. In addition, the phase of the light rays remain synchronized.

Figure 15:
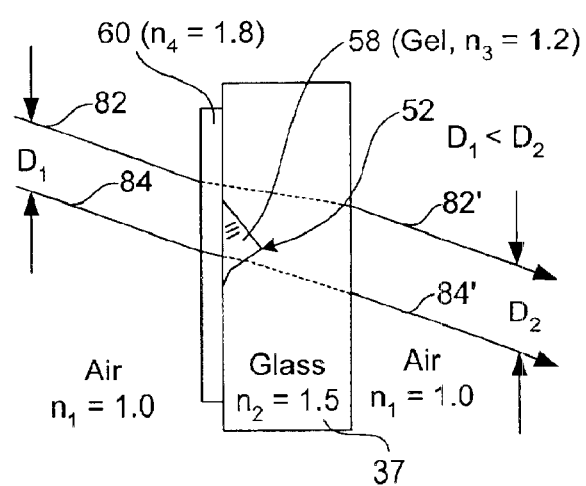
FIG. 15 is a schematic diagram illustrating the effect caused to a pair of parallel beams when one of the beams passes through a surface imperfection that is filled with a void-filling material that has an index of refraction that does not match the index of refraction of the window.

There are two additional considerations that may affect the performance of systems that implement the invention. Both considerations concern the difference between the indexes of refraction of the imperfect window and the void-filling material. As illustrated in FIG. 15, if the index of refraction of void-filling material 58 does not substantially match the index of refraction of the window, problems may result, such as the change in the displacement of parallel light rays 92 and 94 depicted in the Figure. The other consideration is that the matching indexes of refraction need to apply to the wavelength of the light used in the free-space optical communication signal.

It is important to recognize that the index of refraction for a material isn't constant for all wavelengths of light, but actually may vary considerable. This change in index of refraction vs. light wavelength is what enables a prism to separate white light (i.e., a mix of all visible wavelengths of light) into a visible color spectrum. In one embodiment, free-space optical communication signals used in conventional free-space optical communication system 10 include signals having wavelengths of 1550 nanometers and 1625 nanometers, both of which are in the infrared spectrum. Accordingly, perfect optically translucent plate 60 needs to be substantially optically translucent to infrared light having a wavelength corresponding to the free-space optical communications signal that is used. In general, the optical signals used by the invention may fall within the infrared spectrum of 700–1700 nanometers. It is noted that other wavelengths may be used as well, including visible wavelengths and ultra-violet wavelengths, such that the wavelength of the light signal may generally fall within the range of 450–1750 nanometers.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and Figures are accordingly to be regarded as illustrative rather than restrictive. Furthermore, it is not intended that the scope of the invention in any way be limited by the above description, but instead be determined entirely by reference to the claims that follow.

What is claimed is:

1. An apparatus for improving a transmission of a free-space optical communications signal passing through a window having a first imperfect surface including a plurality of non-flat surface voids, comprising:

a void-filling material that is applied in a non-solid form to the first imperfect surface so as to fill any non-flat surface voids in an area on the first imperfect surface through which the optical communications signal is to pass and cured into a solid form such that an outside surface of the void-filling material adjacent to the first imperfect surface is substantially perfectly planar, wherein the void-filling material is selected to have an index of refraction that substantially matches an index of refraction for the window at an optical wavelength corresponding to the free-space optical communication signal.

2. The apparatus of claim 1, wherein the wavelength of the free-space optical communications signal is from 700 to 1700 nanometers.

3. The apparatus of claim 1, wherein the window further comprises a second imperfect surface including a plurality of non-flat surface voids to which the void-filling material is also applied so as to fill any non-flat surface voids in an area on the second imperfect surface through which the optical communications signal is to pass, said void-filling material being cured into a solid form such that an outside surface of the void-filling material adjacent to the second imperfect surface is substantially perfectly planar.

4. An apparatus for improving a transmission of a free-space optical communications signal passing through a window having a first imperfect surface including a plurality of non-flat surface voids, comprising:

a void-filling material that is applied to the first imperfect surface so as to fill any non-flat surface voids in an area on the first imperfect surface through which the optical communications signal is to pass; and a substantially perfect optically translucent plate having an outside surface that is substantially perfectly planar, which is mounted to the first imperfect surface of the window so as to capture the void-filling material between an inside surface of the substantially perfect optically translucent plate and the first imperfect surface of the window, wherein the void-filling material is selected to have an index of refraction that substantially matches an index of refraction for the window at an optical wavelength corresponding to the free-space optical communication signal.

5. The apparatus of claim 4, wherein the void-filling material comprises a liquid.

6. The apparatus of claim 4, wherein the void-filling material comprises a gel.

7. The apparatus of claim 4, wherein the wavelength of the free-space optical communications signal is from 700 to 1700 nanometers.

8. The apparatus of claim 4, wherein the substantially perfect optically translucent plate is mounted to the first imperfect surface of the window by means of an adhesive that is disposed between a peripheral area of the substantially perfect optically translucent plate and the first imperfect surface of the window.

9. The apparatus of claim 8, wherein the adhesive comprises an ultra-violet (UV) curable adhesive that rapidly cures in response to application of UV light.

10. The apparatus of claim 4, wherein the substantially perfect optically translucent plate comprises a type of glass.

11. The apparatus of claim 4, wherein the substantially perfect optically translucent plate comprises a plastic.

12. The apparatus of claim 4, wherein the substantially perfect optically translucent plate includes a protective coating on its outside surface to protect the outside surface from environmental damage.

13. The apparatus of claim 4, wherein the substantially perfect optically translucent plate has a planar cavity defined in its inside surface and wherein the void-filling material is captured between the inside surface of the substantially perfect optically translucent plate and the first imperfect side of the window by inserting the void-filling material into the cavity.

14. The apparatus of claim 4, wherein the window further comprises a second imperfect surface including a plurality of non-flat surface voids to which the void-filling material is also applied so as to fill any non-flat surface voids in an area on the second imperfect surface through which the optical communications signal is to pass, further comprising:

a second substantially perfect optically translucent plate having an outside surface that is substantially perfectly planar, which is mounted to the second imperfect surface of the window so as to capture the void-filling material between an inside surface of the second substantially perfect optically translucent plate and the second imperfect surface of the window.

15. An apparatus for improving a transmission of a free-space optical communications signal passing through a window having a first imperfect surface including a plurality of non-flat surface voids, comprising:

a void-filling material that is applied to the first imperfect surface so as to fill any non-flat surface voids in an area on the first imperfect surface through which the optical communications signal is to pass; and a flexible optically translucent sheet of material that is applied over the area occupied by the void-filling material so as to capture the void-filling material between an inside surface of the flexible optically translucent sheet of material and the first imperfect surface of the window, wherein the void-filling material is selected to have an index of refraction that substantially matches an index of refraction for the window at an optical wavelength corresponding to the free-space optical communication signal.

16. The apparatus of claim 15, wherein the void-filling material comprises a liquid.

17. The apparatus of claim 15, wherein the void-filling material comprises a gel.

18. The apparatus of claim 15, wherein the window further comprises a second imperfect surface including a plurality of non-flat surface voids to which the void-filling material is also applied so as to fill any non-flat surface voids in an area on the second imperfect surface through which the optical communications signal is to pass, further comprising:

a second flexible optically translucent sheet of material that is applied over the area occupied by the void-filling material on the second imperfect surface so as to capture the void-filling material between an inside surface of the second flexible optically translucent sheet of material and the second imperfect surface of the window.

19. The apparatus of claim 15, wherein the wavelength of the free-space optical communications signal is from 700 to 1700 nanometers.

* * * * *